United States Patent
Grydbeck et al.

(10) Patent No.: US 6,467,828 B1
(45) Date of Patent: Oct. 22, 2002

(54) PROTECTIVE ARRANGEMENT

(75) Inventors: Maria Grydbeck, Gråbo; Denny Gustafsson, Kode, both of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/673,731

(22) PCT Filed: Apr. 16, 1999

(86) PCT No.: PCT/SE99/00606

§ 371 (c)(1),
(2), (4) Date: Dec. 11, 2000

(87) PCT Pub. No.: WO99/54171

PCT Pub. Date: Oct. 28, 1999

(30) Foreign Application Priority Data

Apr. 20, 1998 (SE) ................................. 9801365

(51) Int. Cl.$^7$ .................................................. B60P 3/05
(52) U.S. Cl. ....................... 296/24.1; 280/749
(58) Field of Search ................. 296/24.1, 37.16, 296/68.1, 37.5, 37.8; 280/749

(56) References Cited

U.S. PATENT DOCUMENTS

| | | | | | |
|---|---|---|---|---|---|
| 2,884,279 A | * | 4/1959 | Halstead et al. | ............ | 296/24.1 |
| 2,997,331 A | * | 8/1961 | Kudner | ............ | 296/24.1 |
| 2,998,279 A | * | 8/1961 | Mateny | ............ | 296/24.1 |
| 3,044,800 A | * | 7/1962 | Wicker | ............ | 296/24.1 |
| 3,190,687 A | * | 6/1965 | Johnson | ............ | 296/24.1 |
| 3,510,164 A | * | 5/1970 | Setina | ............ | 296/24.1 |
| 3,525,535 A | * | 8/1970 | Kobori | ............ | 280/749 |
| 3,534,998 A | * | 10/1970 | Johnson et al. | ............ | 296/24.1 |
| 3,911,832 A | * | 10/1975 | Vandergriff | ............ | 296/24.1 |
| 3,931,994 A | * | 1/1976 | Palmiter | ............ | 296/24.1 |
| 4,095,837 A | * | 6/1978 | Hunter | ............ | 296/24.1 |
| 4,588,223 A | * | 5/1986 | Ledenyi | ............ | 296/24.1 |
| 4,598,931 A | * | 7/1986 | Miyada | ............ | 280/749 |
| 4,971,378 A | * | 11/1990 | Setina | ............ | 296/24.1 |
| 5,839,757 A | * | 11/1998 | von Lange et al. | ......... | 280/749 |
| 5,876,064 A | * | 3/1999 | Ament et al. | ............ | 280/749 |
| 6,012,753 A | * | 1/2000 | Ordoyne et al. | ............ | 296/24.1 |
| 6,059,313 A | * | 5/2000 | Coogan et al. | ............ | 296/24.1 |
| 6,325,436 B1 | * | 12/2001 | Ehrenberger et al. | ...... | 296/24.1 |

FOREIGN PATENT DOCUMENTS

| | | |
|---|---|---|
| DE | 41 28 527 | 3/1992 |
| DE | 41 28 554 | 3/1992 |
| EP | 289 832 | 11/1988 |
| EP | 587 240 A1 | 3/1994 |
| SE | 402 254 | 6/1978 |

* cited by examiner

*Primary Examiner*—Kiran Patel
(74) *Attorney, Agent, or Firm*—Young & Thompson

(57) ABSTRACT

A protective arrangement for vehicles, comprising a luggage-compartment divider which, in the vehicle, can be pivoted into an active position so as to divide two spaces in the vehicle, or into an inactive position so as to form an opening between the spaces, and a coupling arrangement which is arranged on each side of the luggage-compartment divider and is adapted to engage in a mounting in the vehicle so as to form in this way an articulation around which the luggage-compartment divider can pivot. At least one spring element is arranged so as to preload and thus fix the luggage-compartment divider in the active position and in the inactive position.

8 Claims, 2 Drawing Sheets

PROTECTIVE ARRANGEMENT

FIELD OF THE INVENTION

The present invention relates to a protective arrangement for vehicles, comprising a luggage-compartment divider which, in a vehicle, can be pivoted into an active position so as to divide two spaces in the vehicle, or into an inactive position so as to form an opening between the spaces, and to a coupling arrangement which is arranged on each side of the luggage-compartment divider and is adapted to engage in a mounting in the vehicle so as to form in this way an articulation around which the luggage-compartment divider can pivot.

BACKGROUND OF THE INVENTION

It is previously known to arrange a barrier element, such as a grille made of steel, in the region above the backrest of the rear seat of the vehicle in vehicles of the hatchback or estate type. The grille can prevent articles from the luggage compartment being thrown forwards and injuring the passengers in the vehicle in the event of hard braking or a collision. The grille is fastened pivotably to the ceiling of the vehicle and can be pivoted up towards the vehicle ceiling into an inactive position in which fastening arrangements in the form of clips or clamping members mounted in the vehicle ceiling engage with the grille. To fix the grille in the folded-down, active position, clips are arranged on the rear side of the backrest.

The clips are screwed firmly in the ceiling and the backrest, which means that holes have to be made in the ceiling and the backrest. This involves a complicated work operation and gives rise to a blemish in the form of holes in the interior decor of the vehicle if the grille and the clips are demounted at a later date.

Certain types of vehicle are provided with a flexible safety net which, in an inactive position, is rolled into a space in the backrest of the rear seat. The space is closed by a cover. To divide the luggage compartment and the passenger compartment, the cover is opened and the safety net is unrolled in order to be fastened to the vehicle ceiling. In the event that the backrest of the rear seat is folded forwards, it is also desirable for the safety net to be capable of being unrolled and fastened to the vehicle ceiling. The safety net can thus prevent articles from being thrown forwards towards the passenger compartment.

In the event that a grille is arranged in the vehicle, mounting the clips on the backrest means that the cover for the space into which the safety net is rolled is obstructed, which makes the flexible safety net unusable.

During journeys, it has also been the case that jarring sounds in the form of squeaking have arisen between the grille and the clips and also at the fastening points of the grille on the ceiling.

OBJECT OF THE INVENTION

It is an object of the present invention to eliminate the abovementioned disadvantages in order thus to obtain a protective arrangement which can be fixed in the active and inactive position without extra fastening arrangements mounted on the backrest and in the ceiling, which makes it possible to use a flexible safety net folded into the backrest and which does not give rise to jarring sounds during journeys.

SUMMARY OF THE INVENTION

This is achieved by a protective arrangement of the type indicated in the introduction, in which at least one spring element is arranged so as to fix the barrier element in the active position and in the inactive position.

By using a spring element in order to fix the barrier element, it is not necessary to screw any clips firmly into the vehicle, which is complicated and time-consuming The action of the spring element in the active and inactive position prevents relative movements between different components which gives rise to jarring sounds.

The invention also leads to it being possible to use a safety net which can be rolled into the backrest since no clips obstruct the cover for the space where the safety net is stored.

BRIEF DESCRIPTION OF THE DRAWINGS

The invention will be described in greater detail below by means of an exemplary embodiment shown in the appended drawings, in which.

DETAILED DESCRIPTION OF THE INVENTION

Figure 1:
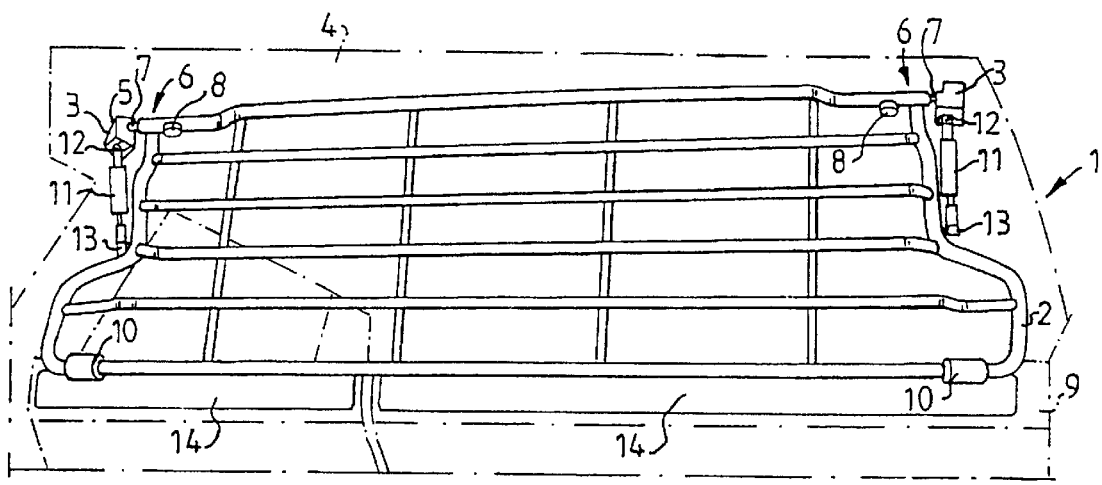
FIG. 1 shows a protective arrangement according to the present invention in a folded-down, active position.

FIG. 1 shows a protective arrangement 1 according to the present invention. The protective arrangement 1 comprises a luggage-compartment divider 2 in the form of a grille 2. The grille 2 shown in FIG. 1 is made from steel tubes and is, on each side of an upper part of the grille 2, pivotably connected to a mounting 3 located on a vehicle ceiling 4. The mounting 3 is preferably made as a holder which has a hole 5 through which a coupling arrangement 6 of the grille 2 can be introduced.

The coupling arrangement 6 comprises a pin 7 which is displaceable in the grille 2 and can be fixed in relation to the grille 2 by a locking screw 8.

FIG. 1 shows the grille 2 in a folded-down, active position in which the grille 2 divides two spaces in the vehicle, such as the luggage compartment and the passenger compartment. The mountings 3 for the grille 2 are therefore located in a region above the backrest 9 of the rear seat or the backrest of the front seats depending on which spaces in the vehicle are to be divided.

Two ferrules 10 made of a resilient material such as rubber, are arranged on the lower part of the grille 2. The ferrules 10 form a portion of the grille 2, which is arranged so as to bear against the rear side of the backrest 9.

The grille 2 is fixed in the folded-down, active position by spring elements 11 which are arranged on each side of the grille 2. The spring elements 11, which in FIG. 1 consist of gas-filled springs, are connected by a first end 12 to the mounting 3 and by a second end 13 to the grille 2. The spring elements 11 according to the exemplary embodiment shown therefore act with a pressure force on the grille 2, so that the ferrules 10 bear against the backrest 9 with a preloaded force. The force from the spring elements 11 also acts on the coupling arrangement 6, which means that relative movement between the coupling arrangement 6 and the mounting 3 is prevented. The occurrence of squeaking and other annoying noise is thus prevented.

FIG. 1 also shows two covers 14 in the rear seat, behind each of which a flexible safety net (not shown) is arranged.

By opening the covers 14 and drawing out the safety nets and then fastening them to the vehicle ceiling, a division of the luggage compartment and the passenger compartment is achieved, as described in the introductory description.

Figure 2:
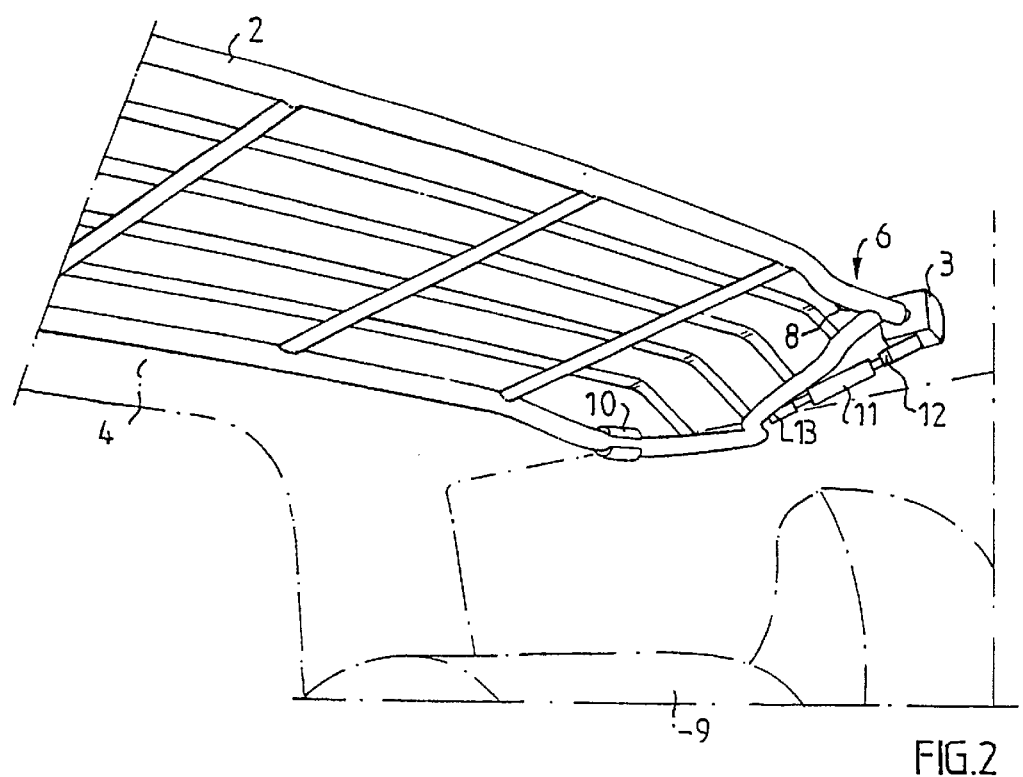
FIG. 2 shows the protective arrangement in a folded-up, inactive position.

FIG. 2 shows the grille 2 in the folded-up, inactive position. In this position, the grille 2 extends in a plane which is essentially parallel to the vehicle ceiling 4. When the grille 2 is folded up into the inactive position, an opening is formed between the spaces in the vehicle. This opening is defined by the top side of the backrest 9, the vehicle ceiling 4 and the side surfaces of the vehicle. The spring elements 11 fix the grille 2 in the inactive position, so that the ferrules 10 bear against the vehicle ceiling 4 with a preloaded force.

Figure 3:
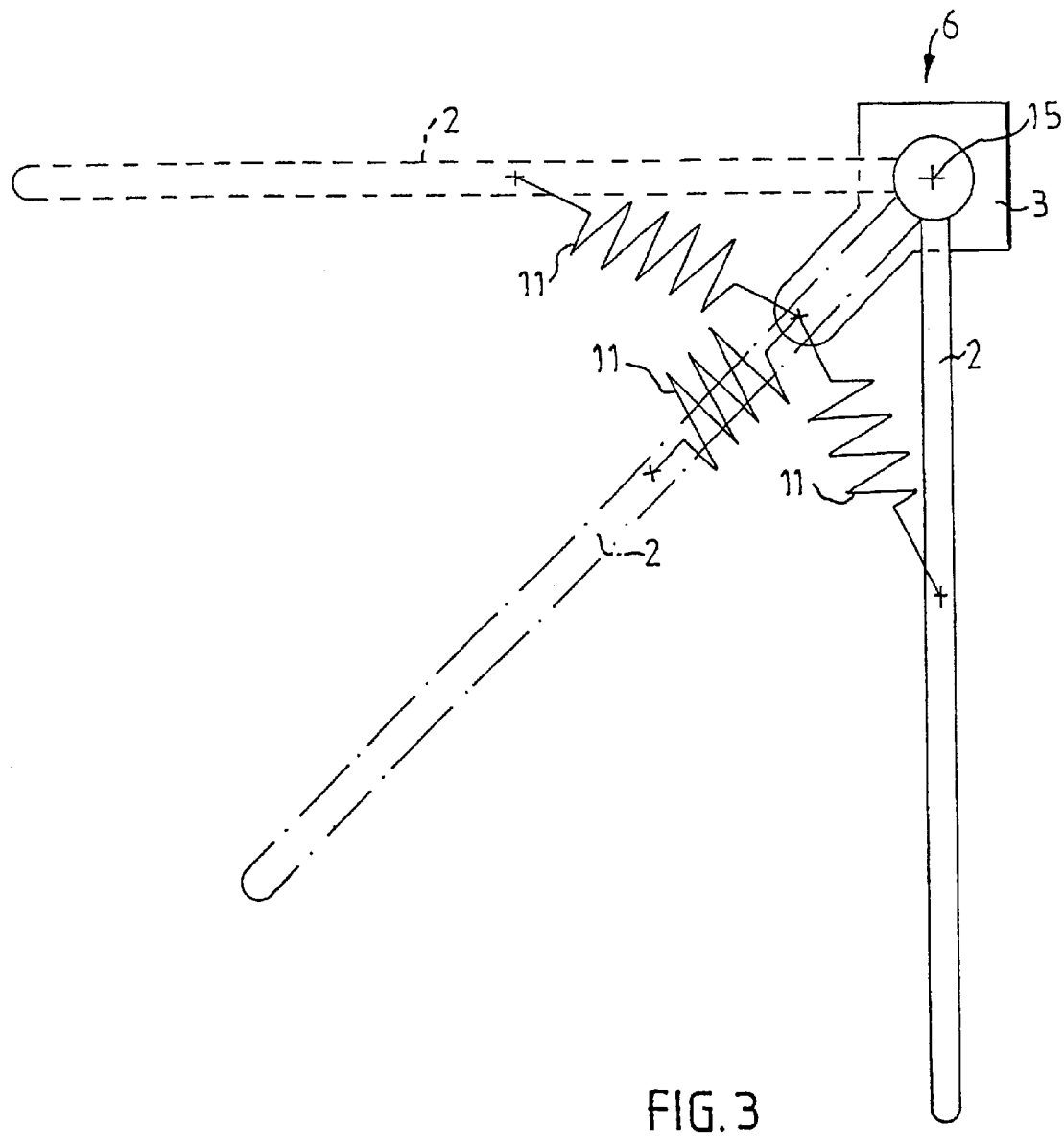
FIG. 3 shows diagrammatically in a side view how a spring element is acted on during pivoting of the protective arrangement between the active and the inactive position.

FIG. 3 shows diagrammatically how the spring element 1 is acted on when the grille 2 is pivoted between the active and the inactive position. The pivoting takes place about an axis 15 which extends through the pins 7 of the coupling arrangement 6 and also through the mountings 3.

In FIG. 3, the grille 2 is drawn with solid lines in the folded-down, active position and with dashed lines in the folded-up, inactive position.

During pivoting of the grille 2 between the active and the inactive position, the grille 2 passes through a position (drawn in dot/dash lines in FIG. 3) in which the spring elements 11 act with a force which is greater than the force with which the spring elements 11 act on the grille 2 in the active or the inactive position. The spring elements 11 in the figures are therefore arranged so that they are compressed most in the position shown in dot/dash lines in FIG. 3 during pivoting of the grille 2 between the active and the inactive position. It is possible, however, for the spring elements 11 to consist of tension springs which are therefore subjected to maximum tensile force in the position shown in dot/dash lines in FIG. 3.

Helical springs, for example, can be used instead of gas-filled springs. The spring elements can be single-acting or double-acting.

The spring elements 11 can, by the first end 12, be arranged on the vehicle ceiling 4 with a mounting separate from the mounting 3 for the coupling arrangement 6 of the grille 2.

What is claimed is:

1. A protective arrangement for vehicles, comprising a luggage-compartment divider (2) which, in the vehicle, can be pivoted between an inactive position in which the divider is raised and an active position in which the divider is lowered, and a coupling arrangement (6) which is arranged on each side of the luggage-compartment divider (2) around which the luggage-compartment divider (2) can pivot, and at least one spring element (11) is arranged so as to preload and thus fix the luggage-compartment divider (2) in the active position and in the inactive position, characterized in that the spring element preloads and fixes the luggage-compartment divider (2) in the active position, so that the luggage-compartment divider (2) bears against a backrest (9) with a preloaded force.

2. The protective arrangement according to claim 1, characterized in that the spring element (11) is connected by a first end (12) to the mounting (3) and by a second end (13) to the luggage-compartment divider (2).

3. The protective arrangement according to claim 1, characterized in that the spring element (11), in a position during pivoting of the luggage-compartment divider (2) between the active and the inactive position, acts on the luggage-compartment divider (2) with a force which is greater than the force with which the spring element (11) acts on the luggage-compartment divider (2) in the active or the inactive position.

4. The protective arrangement according to claim 1, characterized in that the mounting (3) is arranged on the ceiling (4) of the vehicle, on both sides of the vehicle and in a region above a backrest (9) arranged in the vehicle, so that a portion of the luggage-compartment divider (2) bears against the rear side of the backrest (9) in the active position and against the ceiling (4) in the inactive position.

5. The protective arrangement according to claim 4, characterized in that said portion of the compartment divider (2) comprises a ferrule (10) made of a resilient material.

6. The protective arrangement according to claim 1, characterized in that a spring element (11) is arranged on both sides of the luggage-compartment divider (2).

7. The protective arrangement according to claim 1, characterized in that the spring element (11) comprises a compression spring, such as a gas-filled spring or a helical spring.

8. The protective arrangement according to claim 1, characterized in that the luggage-compartment divider (2) comprises a grille made of steel.

* * * * *